United States Patent [19]

De Rosa

[11] 4,247,255
[45] Jan. 27, 1981

[54] COMPOSITE ROTOR BLADE ROOT END

[75] Inventor: Richard T. De Rosa, Brookhaven, Pa.

[73] Assignee: The Boeing Company, Seattle, Wash.

[21] Appl. No.: 21,042

[22] Filed: Mar. 15, 1979

[51] Int. Cl.³ .............................................. B64C 27/48
[52] U.S. Cl. .................................... 416/141; 416/226;
416/230
[58] Field of Search ................... 416/134 A, 141, 226,
416/230 A

[56] References Cited

U.S. PATENT DOCUMENTS

| | | | |
|---|---|---|---|
| 3,476,484 | 11/1969 | Brunsch | 416/230 A |
| 3,674,379 | 7/1972 | Monti | 416/226 |
| 3,950,115 | 4/1976 | Euler | 416/226 |
| 4,120,610 | 10/1978 | Braswell et al. | 416/226 |

Primary Examiner—John J. Vrablik
Attorney, Agent, or Firm—Felix J. D'Ambrosio; Edwin E. Greigg; Jack D. Puffer

[57] ABSTRACT

A helicopter rotor blade fabricated from laminated fiber-reinforced resin includes a blade root end attachment to the rotor hub that provides a structural extension capable of developing chordwise bending moment continuity across a single-pin joint. The extension is a spanwise continuation of the nose block and heel portions of the spar and continues inboard of the blade attachment pin about which the primary axial load-carrying portions of the spar are wrapped. The structural extension is formed as an integral part of the blade spar without secondary bonding or the use of pre-formed fittings.

6 Claims, 6 Drawing Figures

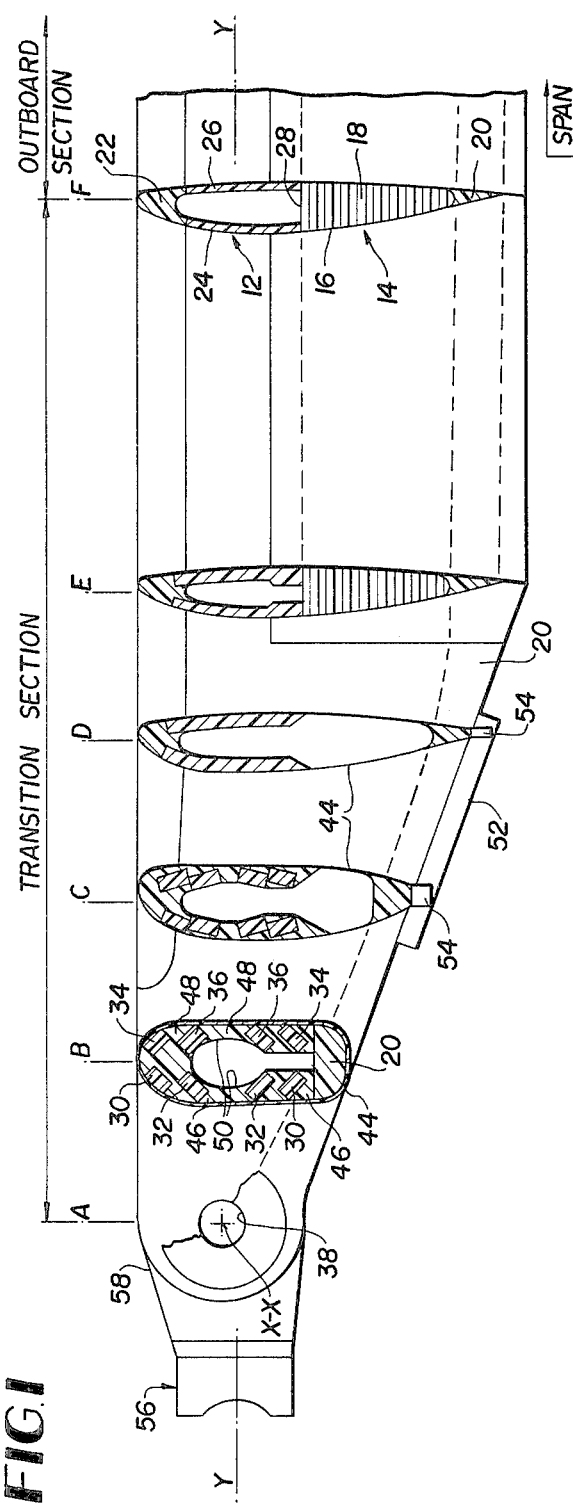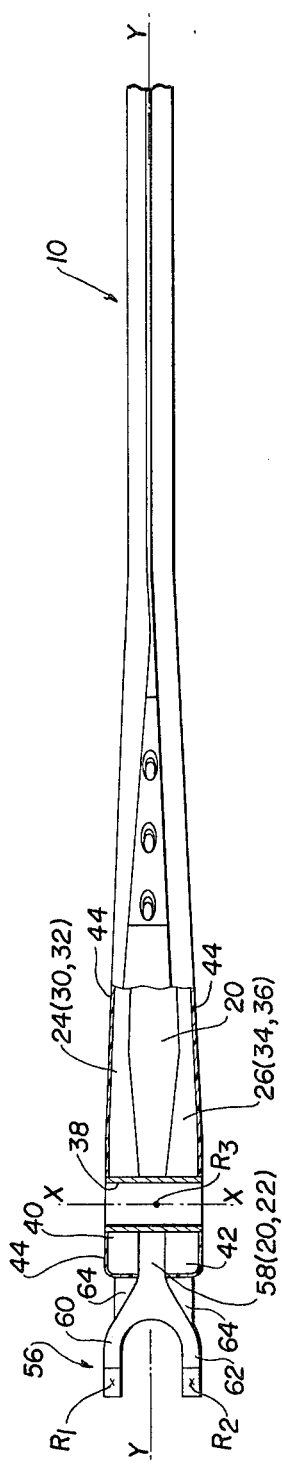
FIG.1
FIG.2

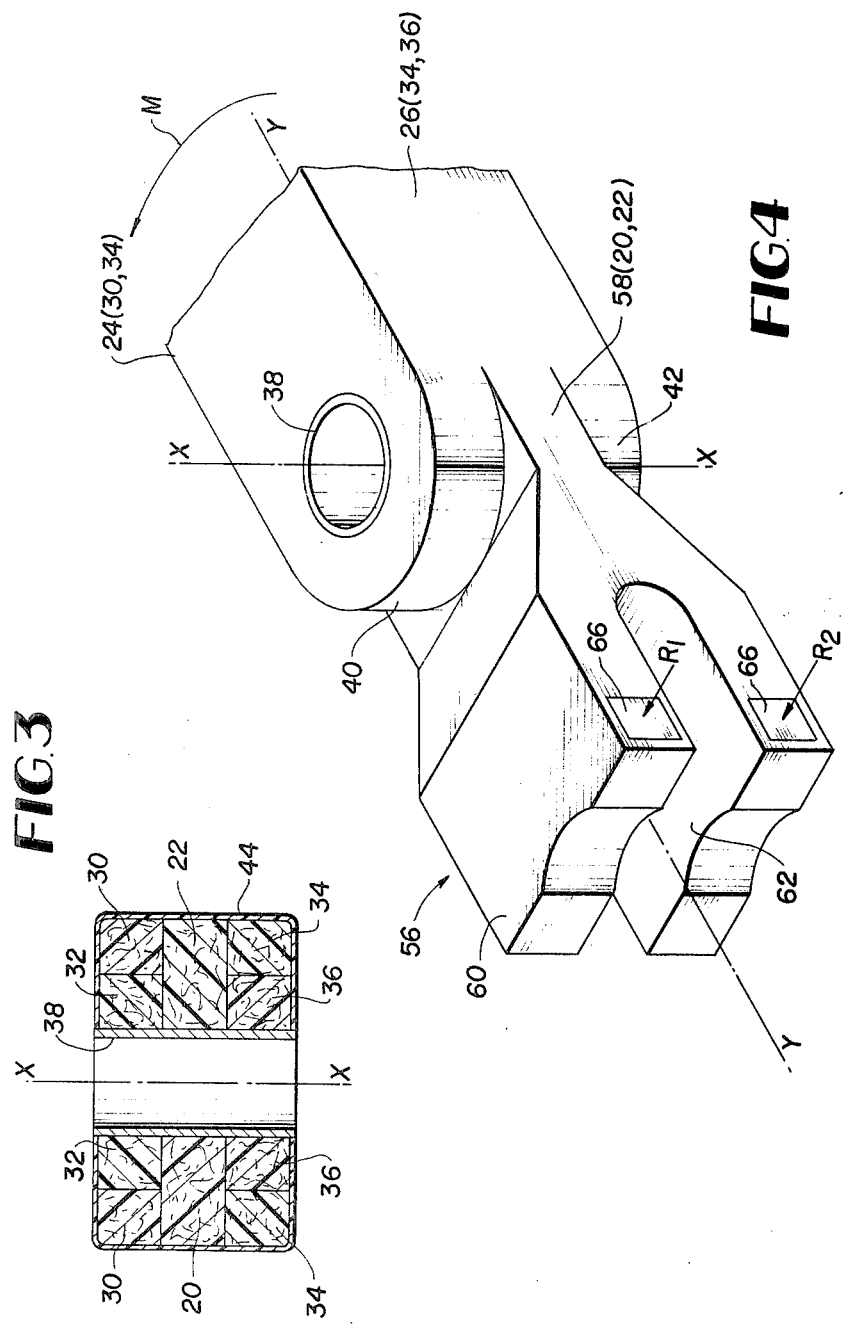

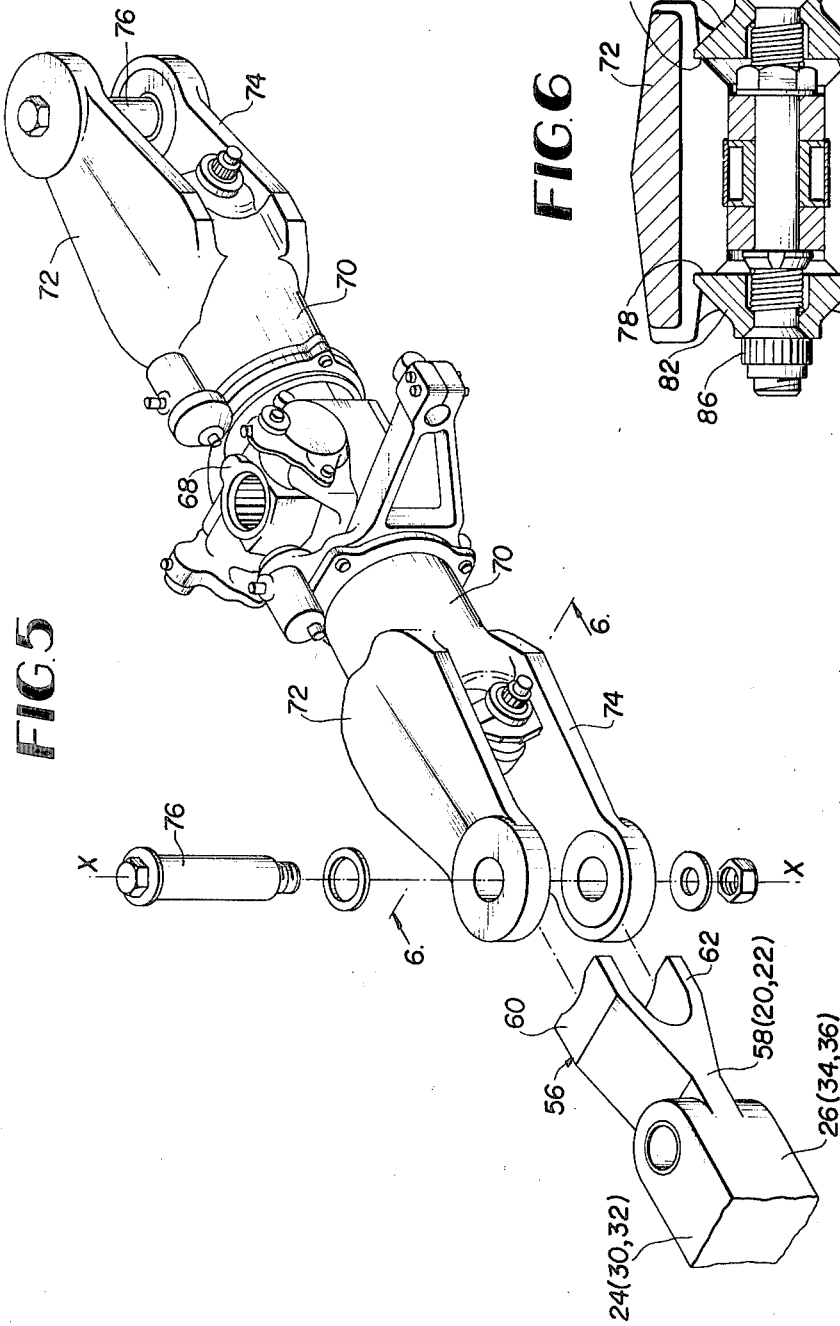

COMPOSITE ROTOR BLADE ROOT END

BACKGROUND OF THE INVENTION (a) Field of Invention

This invention generally relates to a root end portion of a helicopter rotor blade, and more particularly to the root end of a rotor blade fabricated from fiber-reinforced resin materials.

(b) Prior Art

Helicopter rotor blade manufacture has progressed from fabrication from wood spars and ribs and stiffened fabric fairings, to intermediate construction techniques employing bonding discrete, metal spars, ribs and fairing skins into a unitary assembly. More recently, new materials known generally as composites, are being used to form the primary structural components and the secondary non-structural fairings as well. These materials are employed generally in the laminate or roving form and comprise a partially-cured yet flexible resin matrix, usually epoxy, phenolic or similar material, reinforced by continuous thin strands of synthetic fibers. The increasing use of composite materials in the partially cured form, that is later cured to a final shape upon the application of heat and pressure, has permitted the necessary structural reactions to be provided in novel ways that are economic of material and manufacturing labor.

For example, the root end of any rotor blade must be attached to the rotor hub. This attachment must be capable of transferring the dynamic and aerodynamic loads developed within and applied to the rotating blade. Furthermore, the joint must allow easy disassembly of the rotor blade from the rotor hub in a way that requires minimum expertise and standard tools.

Centrifugal force, which is substantially aligned with the spanwise blade pitch axis, and flapwise bending moments are readily introduced to the rotor hub from the rotor blade root end by way of a pinned-joint whose axis is essentially normal both to the blade span and to the rotor mid-plane. However, in-plane bending moments or chord-wise bending is not readily accommodated in a single pin joint whose axis is substantially vertically aligned.

Various arrangements of the structural components in the vicinity of the rotor blade attachment joint have been attempted to produce the requisite strength, stiffness and reliability. In-plane bending is known to produce large and concentrated forces in the rearmost component of the rotor blade known as the trailing edge block. For this reason, struts or rods have been variously attached to the inboard end of the trailing edge at some point that is outboard of the blade-hub attachment joint. The strut, which may incorporate an energy-dissipating damper is attached to the rotor hub at a spanwise position that is inboard of the attachment. In this way, the strut transmits the trailing edge force across the attachment joint and chordwise bending moment continuity is provided. Obviously, this load path requires several individual parts in addition to the principal constituent parts of the rotor blade and involves a structural joint at both ends of the strut. Good engineering practice attempts to limit the number of structural joints, which are well known to present risk of premature failure given the considerable fatigue-intensive nature of the helicopter operating environment.

A second approach taught from preceding developments in the art and particularly directed to root end attachments involving rotor blades formed of composite materials involves use of a machined metal fitting at the attachment joint. Usually this fitting is bonded to the composite materials during or immediately after the heat cycle that cures the composite into its final shape. By way of this bond, the in-plane bending moment is transmitted from the blade root to the fitting for subsequent reaction on the rotor hub. Alternatively, instead of causing the fitting to be bonded to the composite, the metal fitting may be fitted to the outer surface of the blade root in two complementary halves that are clamped shut by bolts. Chordwise moments are transmitted from the blade root to the fitting by bearing contact between the outer root surface and the inner surface of the fitting.

Either use of a machined metal fitting requires a precise matching of the blade root outer contour to the fitting contour. Also, there is inherent disparency in the coefficients of thermal expansion between the metal and the composite blade material that produces residual thermal stress on bonding at elevated temperatures. The additional cost to form the metal part, which usually is of titanium having the associated forming difficulties that are characteristic of this metal, is another disadvantage. Of particular concern where a preformed fitting is incorporated in an assembly having composite material parts is the quality and reliability of the bond that joins the rotor blade structure to the fitting. The mating surfaces must be kept free of contaminants. In addition, the strength of the bond is determined by continuity along its length. Pockets of entrapped air are a common source of interruption in the bond whose presence must be discovered with electronic equipment usually employing sonic detection techniques. Of course, the quality of the bondline is substantiated only after the curing process is complete, but if a substandard joint has been made an elaborate disassembly and rebonding procedure is required.

SUMMARY OF THE INVENTION

In accordance with the present invention, there is provided a rotor blade root end having the principal load carrying element fabricated of laminated, fiber-reinforced, resin matrix materials formed into a pinned joint connection to the rotor hub. The blade root end includes a spanwise extension of the nose block and heel portions of the spar to transmit in-plane bending moments from the rotor blade to the rotor hub. Such a blade root end includes an attachment pin disposed substantially perpendicular to the spanwise axis and to the mid-plane of the blade.

The laminated composite material components of the rotor blade are assembled having their spanwise location determined with respect to the centerline of the attachment pin. The upper and lower walls of the spar form upper and lower lugs through which the attachment pin is fitted and the connection to the rotor hub made. A spar nose block and a trailing edge block are formed at the leading and trailing sides of the blade cross-section and extend in bonded connection to the blade structure over the spanwise length of the blade. These blocks merge into a unitary root extension in the vicinity of the attachment pin and extend inboard of the inboardmost extremity of the spar lugs to form two flanges capable of engaging the rotor hub. This root extension carries the in-plane bending moments to the rotor hub for reaction and is capable of having transferred to it, by way of the bonded attachment to the spar structure, the force carried by the spar that results from its bearing a portion of the chordwise bending moment.

The invention herein disclosed and claimed achieves a number of specific objects, among these being:

a rotor blade root having a structural extension reaching inboard of the spar for transmitting chordwise bending loads to a rotor hub;

a blade root extension integrally formed with the blade structure and extending over a substantial spanwise length of the blade;

a structural component capable of having transmitted to it the chordwise bending forces carried by other components of the blade structure;

an efficient and stiff load path for providing in-plane bending continuity in a blade root across a single pin attachment to a rotor hub without the use of trapped metal fittings or preformed fittings of any kind;

providing a means for reacting chordwise bending in a single pin blade-hub attachment without the need for bonding operations joining fittings to the blade structure subsequent to the cure cycle that forms the blade spar; and the elimination of secondary bond cure cycles and their uncertain reliability in a rotor blade root.

BRIEF DESCRIPTION OF THE DRAWINGS

FIG. 1 is a plan view of a rotor blade, primarily at the root end, made according to the invention;

FIG. 2 is an edge view corresponding to the plan view of FIG. 1;

FIG. 3 is a cross-section of the blade root taken at station A of FIG. 1;

FIG. 4 is an isometric elevation view of a blade root and root extension made according to the invention;

FIG. 5 is an isometric elevation view of the main rotor hub to which two blades according to the present invention are attached; and FIG. 6 is a partial cross-sectional view taken along the line 6—6 of FIG. 5.

DESCRIPTION OF THE PREFERRED EMBODIMENT

Referring to the drawings, a helicopter rotor blade 10 is shown in FIG. 1. The typical rotor blade is divided into an outboard section to the blade tip (not shown) and a root end or transition section. The outboard section is characterized by a constant cross-sectional configuration, while the transition section is characterized by a changing cross-sectional configuration. To better illustrate these sections of the rotor blade, selected cross-sections are superimposed onto FIG. 1 at their true station, i.e., radius along the rotor blade. These stations are designated A–F.

Although the invention resides in the construction of the rotor blade inboard of the transition section, a discussion of the construction of the rotor blade in the outboard and transition sections should prove helpful to a better understanding of the invention.

In the outboard section, beginning at station F, the rotor blade comprises a spar 12, which is the primary load carrying member, positioned at the leading portion of the blade section that has generally an airfoil-shaped outer contour. Behind the spar 12, an aft fairing 14 having a thin outer skin 16 supported by a honeycomb core 18 extends to the trailing edge of the airfoil and terminates in a trailing edge block 20. At the leading portion of the spar, a spar nose block 22 is formed having the contour of the airfoil and extending chordwise into contact with the upper spar wall 24 and lower spar wall 26. A thin spar web or heel 28 at the extreme trailing end of the spar walls is bonded to the honeycomb core and forms a closure producing a spar that is, outboard of the transition section, a closed airfoil-shaped tube.

Between stations E and F, the rotor blade undergoes a gradual transformation. At station E, and extending inboard, the rotor blade shape undergoes a more rapid transformation from the airfoil contour of station F to the shape illustrated in FIG. 3 (station A).

The upper spar wall 24 on the leading side of the blade pitch axis Y—Y is seen, at station B, to divide into two segments 30, 32, which rotate gradually over the length of the transition section. This rotation causes the segments 30, 32 to alter their position with respect to the outer contours. For example, at station E the segments are positioned parallel to the airfoil contour, but at station A the segments have been rotated to a position perpendicular to the outer contour and mutually abut in back-to-back arrangement. Similarly, the lower spar wall 26 is divided into two segments 34, 36. These segments, also, rotate gradually over the length of the transition region from being positioned parallel to the airfoil contour at station E to being perpendicular to the contour at station A. The spar walls 24, 26 are preferably formed of unidirectional composite materials whose reinforcing fibers extend spanwise and are laminated to produce an increasing thickness from the outboard to the inboard extremities of the transition section.

The spar wall segments 30, 32, 34, 36 are carried inboard to station A where they turn around the circumference of cylindrical sleeve 38 and are led outwardly therefrom to produce an upper lug 40 and lower lug 42 (FIGS. 2 and 4), which mount the rotor blade to the rotor hub (FIG. 5). The spar wall segments 30–36, over the length of the transition section, again rotate gradually from standing on edge and abutting in back-to-back arrangement, as illustrated at station A, to being returned to a parallel disposition with respect to the airfoil contour at station E.

An outer skin 44 (shown only in FIGS. 2 and 3 for clarity) is preferably formed from X-ply composite material and covers the blade forming an upper and lower torsion wrap for reacting torsion loads on the blade. The skin 44 also establishes an aerodynamically efficient outer contour in the transition section.

During the process in which the resin matrix is cured with heat and pressure to complete the molecular chains that produce the solid state condition, the outer skin 44 and spar wall segments 30–36 require support to prevent their wrinkling and movement. An upper filler 46 and a lower filler 48 (FIG. 1) are provided under the outer skin 44 and around the spar wall segments 30–36. The fillers can be formed of randomly oriented fibers and are further formed to accommodate the rotation of the wall segments and to stabilize their position within the space bounded by the outer skin and by an inner spar wrap 50.

The trailing edge block 20 is fabricated of composite material having uniformly directed reinforcing fibers, which are substantially aligned parallel to the blade pitch axis Y—Y in the blade section outboard of station E. In the transition section, the block 20 undergoes a sharp directional change toward the pitch axis Y—Y and, over the length of the section, a substantial, yet gradual, increase in size. Inasmuch as the spar web 28 terminates in the vicinity of station E, the trailing edge block 20 provides a closure function. When required, laminated balance weights 52 can be mounted to the trailing edge block at attachments 54. At station A the block 20 alters direction again, the fibers becoming once again substantially aligned with the pitch axis Y—Y. Inboard of station A the trailing edge block 20 and the spar nose block 22 merge to a monolithic unit that forms the blade root extension 56.

The spar nose block 22 is formed of composite material having its reinforcing fibers aligned substantially parallel to the pitch axis Y—Y throughout the length of the blade span. In the transition section, the nose block 22 is shaped to accept the spar wall segments 30-36 and to accommodate their rotational development. In this way, together with the effect of the fillers 46 and 48, a solid and compact mass of composite material occupies the leading edge and mutually supports and locates the abuting components during the cure cycle. Each component is joined by adhesive bonding to an abuting component during the cure cycle.

At station A the trailing edge block 20 and spar nose block 22 are positioned intermediate the upper spar wall segments 30, 32 and the lower spar wall segments 34, 36 (FIG. 3). The outer surface of the sleeve 38 defines the inner surface of the blocks 20, 22. The outer skin 44 Forms an outer boundary and the interior edges of the upper spar wall 24 and lower spar wall 26 define the respective upper and lower surfaces.

Inboard of station A, the rotor blade is altered in accordance with the invention. According to the invention, the trailing edge block 20 and the spar nose block 22 merge around the inboard periphery of sleeve 38 to form the root extension 56. Extending across the chordwise width of the contour at station A inboard from that station is a web 58 having a length sufficient to clear the contour of the upper and lower spar walls 24, 26. An upper flange 60 and a lower flange 62 extend inboard from the web 58 and are spaced apart by reason of the flanges projecting upwardly and downwardly, respectively, from the plane of the web. The flanges extend spanwise in parallel planes that are aligned with the blade midplane and are relieved by a filler block 64 (FIG. 2 only for clarity). The filler block, like fillers 46 and 48, is preferably formed of randomly oriented fibers and surrounds the web 58 and outboard portions of the flanges 60 and 62. The filler block 64 serves to hold the position of the flanges and web during fabrication. It, of course, forms an integral part of the web and flange assembly during the cure cycle.

The rotor hub reaction to the in-plane forces produced by chordwise bending (moment M) and carried by the root extension 56 are developed by bearing forces $R_1$ and $R_2$ acting on the outer surfaces of the flanges 60, 62, preferably at wear plates 66. A second portion of the reaction $R_3$ is developed by bearing contact between the sleeve 38 and the abuting surface of the blocks 20, 22 as shown clearly in FIG. 2, which contact produces a second force of a couple.

At station A, which forms the joint whereby the blade is attached to the rotor hub, the various forces, bending moments and twisting moments carried by the blade structure are transferred to the rotor hub with the exception of in-plane or chordwise bending moments. These bending moments are reacted on the rotor hub that interacts with the root extension and therefore are transmitted to the rotor hub by the extension. To the extent that the spar wall segments 30-36 and other structural components carry load resulting from chordwise bending effects, that load must be transferred to its ultimate reaction on the rotor hub by way of the root extension 56.

Abruptly transferring load from one structural component to another, particularly in the vicinity of a joint where many large and cyclic forces are undergoing transition, is known to have potential for structural failure. The present invention avoids difficulties in this regard by integrally forming by way of a bonded connection between the spar segments 30-36, the nose block 22 and the trailing edge block 20, a unitary construction over a substantial length of the blade root, over which length the requisite load transfer may gradually and controllably occur. Furthermore, forces produced by the effects of chordwise bending having been transferred to the root extension 56 are carried in this part to their reaction on the rotor hub to which the extension transfers the load.

FIGS. 5 and 6 illustrate the known manner in which the blade is attached to the main rotor hub 68. A two-bladed hub is shown, although three and four-bladed hubs are also known. The main rotor hub 68 has a hub grip 70 bolted on each side to receive the blade. Each hub grip 70 has an upper arm 72 and a lower arm 74 which define at their free end along with the sleeve 38, the vertical pin attachment. The blade is mounted to the hub grip by a vertical pin 76.

FIG. 6 illustrates the manner in which the root extension 56 is received in the hub grip to achieve the moment reaction noted above. The flanges 60 and 62 extend into the hub grip 70 between the upper and lower arms 72 and 74. The wear plates 66 (FIG. 4) engage surfaces 78 and 80 of lugs 82. The bearing forces $R_1$ and $R_2$ are produced by the mutual engagement of the wear plates 66 and the surfaces 78 and 80 as a reaction to the moment M. The lugs 82 are mounted on bolt 84 by nuts 86.

In the drawings, FIGS. 2 and 4, there appears the following designations: 24 (30,32); 26 (34,36) and 58 (20,22). This means that the spar walls 24 and 26 are formed, during fabrication of the segments, or straps 30, 32, 35, 36; while the web 58 is formed, during fabrication, of blocks 20 and 22.

Having described above the principle of the invention in connection with a specific embodiment, it should be understood that this description is made by way of example and not as a limitation to the scope of the invention as set forth in the objects hereof and in the accompanying claims.

What is claimed and desired to be secured by Letters Patent of the United States is:

1. A composite helicopter rotor blade for attachment to a rotor hub of a helicopter, comprising:
   an elongated composite spar;
   an elongated composite spar nose block attached to the elongated composite spar along a front surface thereof;
   an aft fairing attached to the elongates composite spar along a rear surface thereof;
   an elongates composite trailing edge block attached to the fairing;
   rotor hub attachment means formed by the elongated composite spar, the elongated composite spar nose block and the elongated composite trailing edge block; and a blade root extension formed as a monolithic unit by the elongated composite spar nose block and the elongated composite trailing edge block, wherein:
  (i) the elongated composite spar, the elongated composite spar nose block, the aft fairing and the elongated composite trailing edge block form, in assembly and outboard of the rotor hub attachment means, an airfoil of spanwise varying cross-sectional configuration;
  (ii) the blade root extension monolithic unit extends, spanwise, inboard of the rotor hub attachment means; and
  (iii) the blade root extension transmits chordwise bending moments to the rotor hub.

2. The composite helicopter rotor blade as defined in claim 1, wherein the rotor hub attachment means comprise a bore for receiving an attachment pin.

3. The composite helicopter rotor blade as defined in claim 1, wherein the elongated composite spar includes an upper and lower wall, and wherein at the rotor hub attachment means, the elongated composite spar nose block and the elongated composite trailing edge block are positioned intermediate the upper and lower spar walls.

4. The composite helicopter rotor blade as defined in claim 1, wherein the blade root extention monolithic unit includes a pair of substantially parallel flanges extending inboard from the rotor hub attachment means, each having a surface for transmitting said rotor blade chordwise bending moments to the rotor hub.

5. The composite helicopter rotor blade as defined in claim 1, wherein the elongated composite spar nose block and the elongated composite trailing edge block are formed from materials having a fiber reinforced resin matrix.

6. The composite helicopter rotor blade as defined in claim 1, wherein the elongated composite spar, the elongated composite spar nose block and the elongated composite trailing edge block are formed from materials having a fiber reinforced resin matrix.

* * * * *